*D. Gore,*
*Hedge Saw.*

*No. 92,602.* *Patented July 13, 1869.*

WITNESSES
INVENTOR

United States Patent Office.

DAVID GORE, OF CARLINVILLE, ILLINOIS.

Letters Patent No. 92,602, dated July 13, 1869.

---

IMPROVEMENT IN SAWS FOR CUTTING HEDGE FOR PLASHING.

---

The Schedule referred to in these Letters Patent and making part of the same.

---

*To all whom it may concern:*

Be it known that I, DAVID GORE, of Carlinville, in the county of Macoupin, and State of Illinois, have made certain new and useful Improvements in Saws for Cutting Hedges, and similar purposes; and I do hereby declare that the following is a full and true description thereof, reference being had to the accompanying drawings, and to the letters of reference marked thereon.

This invention relates more especially to saws for cutting the stalks of hedge-plants, preparatory to bending and interlacing said stalks and the branches of said plants, as in the operation known as "plashing," the object of said operation being to form a more impenetrable and compact growth of hedge.

To avoid undue exertion and great labor, it is in the nature of this invention to form a saw, which may be readily applied to the hedge-plant, and which may be operated by hand of the workman, without necessitating a position of body, or an exertion, which causes undue fatigue.

Figure 1:
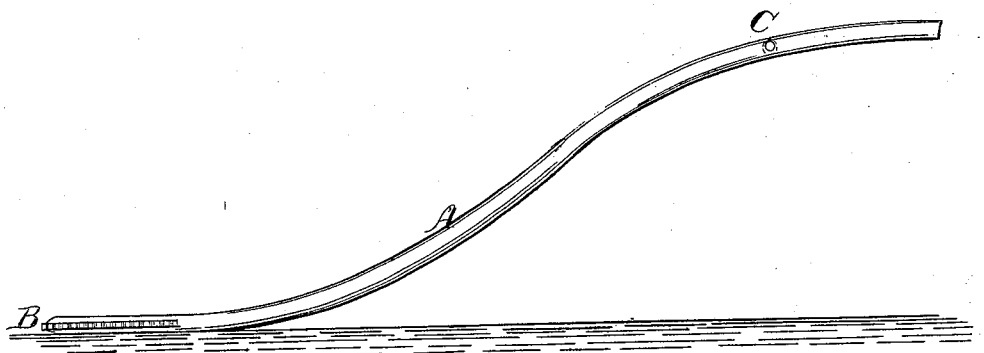

To enable those herein skilled to make and use my said improvement, I will now more fully describe the same, referring to the accompanying Figure 1 as an elevation'

Figure 2, as a plan.

I form the handle A of some light and strong material, curving the same in a $\sim$ shaped curve. At the lower end of said handle, I secure the saw-blade B, usually of steel, and having the usual teeth for cutting, as in wood-saws.

Figure 2:
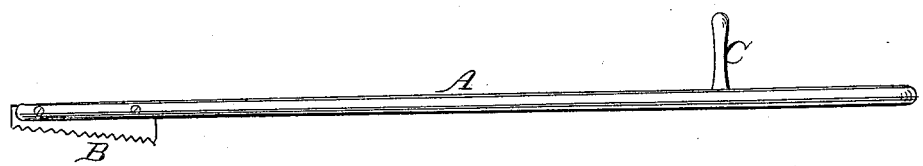

In order that the operator may readily enter said saw at any desired locality in the hedge, and especially to enable the operator to apply the saw-blade to the hedge-plant near the ground, the said saw is made narrower at each forward than at its rear end, as shown in fig. 2.

The saw in use is applied in about a horizontal position, to cut the stalks, the end of the handle resting, if possible, upon the ground, as indicated in fig. 1.

To enable the operator to move the saw in cutting, I provide the handle A with a side grip, C, which may be grasped, and by which the handle and saw may be moved as required in cutting.

In the operation of cutting with the saw, thus described, the operator stands erect and in an easy position, and at a safe distance from the briars of the hedge, thus enabling the operator to readily make the required incision in the plant preparatory to bending the same. The incision thus made will usually extend about half way through the stalk, and will not cause the undue laceration of the bark usually accompanying cuttings by axe or hatchet.

Having thus fully described my invention,

What I claim is—

The saw B, connected to the handle A, this being curved to the form indicated in the drawings, and having a grip, C, substantially, in the manner set forth.

In witness of said invention, I have hereunto set my hand in the presence of witnesses.

DAVID GORE.

Witnesses:
GEO. P. HERTHEL, Jr.,
WILLIAM W. HERTHEL.